Patented Jan. 21, 1947

2,414,632

UNITED STATES PATENT OFFICE 2,414,632

METHOD FOR PREVENTING WAKE FORMATION

Gerome Brush, Brookline, Mass.

No Drawing. Application January 30, 1943, Serial No. 474,232

7 Claims. (Cl. 252—1)

This invention relates to a method of treating the foam or wake left by a moving vessel so as to prevent or dispel it and render it invisible.

As is well known, when a surface vessel passes at any appreciable speed through the water, it agitates the water sufficiently to mix some of the atmospheric air with the water. If the vessel is power driven, the propellers cause a much greater agitation of the water and air and it leaves a much wider and deeper wake than sailboats, for example. The wake thus formed reflects the light as a more or less white mass against the darker or non-reflecting surface of the water and is in consequence visible at great distances. Whether viewed horizontally or downwardly from an airplane, the wake is usually much more visible and in fact is very conspicuous in comparison with the visibility of the boat itself. Consequently it not only reveals the location of the boat but is a clearly identifying index of its course, its speed, and its size, if not of the character of the boat itself, to a considerable extent.

In warfare, such a demonstration of the presence and movements of a boat upon the water presents a serious consideration from the standpoint of observation and attack, by airplane from above especially, but also by other surface craft or submarines. It is accordingly an important object to overcome such effects of the foam and wake which is formed behind surface vessels (or submarines) so as to offset their formation so far as possible and at least to overcome the long range visibility which they present as a target for enemy attack.

Other objects will appear from the following disclosure.

It is found as a part of the present invention that the wake formed by a moving vessel may be rapidly dispelled or quenched by applying a fine spray of a suitable reagent or reagent solution to the surface of the water immediately behind the stern of the vessel and in back of the water leaving the propeller blades. It should be finely divided and should be released only at, or a short distance, say a foot, above the surface of the water in order to prevent its being blown away by the wind and thus rendered ineffective for the intended purpose. It should also be applied to a sufficient area to include the full width of the wake which is formed as the boat passes along its course.

In this way, the bubbles or air, which of course must rise to the surface of the water, nevertheless do not spread out upon the surface of the water nor accumulate to form a foam. On the contrary, they break almost immediately upon coming through the free surface of the water and before they form the bright, light-reflecting surfaces which are characteristic of the foam and wake usually produced under such circumstances. Hence, it may be said that the foam, although formed in its incipient stages, is quenched before it develops to such a degree as to be visible or at least noticeable at any great distance from the moving vessel.

A relatively small amount of reagent material is sufficient and this, in being supplied as a spray, may be greatly diluted without reducing its efficiency to overcome the foam of the vessel. It is in fact advantageous to dissolve the reagent in a solvent which is quickly and freely miscible with and soluble in water, although the reagent itself may be quite insoluble in water. Moreover, the mixture should, for best advantage, be lighter in weight than the water so as to spread out and remain upon the surface. For it is on the surface that the reagent is most effective. If the reagent is released beneath the surface of the water its action to overcome foam is relatively less effective.

The solvent employed may serve this purpose of buoyancy by being lighter than the water while the reagent material used with it is appreciably heavier. Thus with ethyl alcohol as a solvent, or better still methyl alcohol, the specific gravity is considerably less than that of sea water. Both ethyl and methyl alcohol will mingle freely and quickly in water and spread out over its surface, at least temporarily, and form a surface film, before completely dissolving or evaporating. Likewise a mixture of ethyl and methyl alcohol may be used satisfactorily for this purpose.

Ethyl and methyl alcohol, in such a surface layer, are not alone effective to dispel foam. But it is discovered that if an oil-soluble dye is dissolved in ethyl or methyl alcohol, or in a mixture of them, the resulting solution constitutes a very effective reagent to dispel foam and thus overcome the formation of a wake in the track of a moving vessel. It is significant that the bubbles burst much sooner and in fact almost immediately, and foam is thus prevented from forming and accumulating upon the surface. This observed fact may be explained by assuming that the dispersing and diluting film of the alcohol solution ultimately precipitates the oil-soluble dye contained therein, which is insoluble in water, in the form of finely divided and widely disseminated solid particles, and that these, in the film of alcohol through which the bubbles rise, weaken the resulting thinning film, as the bubble tends to force upward into the atmosphere and transform itself into a surface bubble, and cause the bubble to burst before it reaches the necessary size to enclose the volume of occluded air which is thus rising through the surface of the water, at any given place.

But another influence is believed to be effective, namely, that the dye reduces the tendency of the alcohol solvent to evaporate into the air and thus be rendered ineffective upon the subsequent emergence of bubbles and the formation of foam thereby.

A confirmation of the latter effect is found in the fact that it is discovered as a part of the invention that a similar alcohol solution of diisopropyl carbinol, which is a liquid of a considerably higher boiling point (140° C.) than ethyl or methyl alcohol, and which is also but very slightly soluble in water, will also serve to dispel foam from sea water in a like manner. Likewise diphenylamine may be so used dissolved in Solox in the proportions of ¼ pound of diphenylamine to 2 quarts of Solox.

Solox consists essentially of S. D. alcohol No. 1 having a composition of 100 gallons pure ethyl alcohol to 5 gallons pure wood alcohol, plus 1.15 parts of ST–115, 1 part of ethyl acetate and 1 part of aviation gasoline. ST–115 is a denaturant for alcohol described on page 3 of "Appendix to Regulations No. 3 Formulae for Completely and Specially Denatured Alcohol" of the U. S. Treasury Department Bureau of Internal Revenue—United States Printing Office, Washington, D. C., 1942.

It is found, more specifically, that while a mixture of ethyl and methyl alcohols, in approximately equal proportions, may be used as above described, the denatured alcohol mixture, known as Solox (made by United States Industrial Chemical Company) is even more effective. While other oil-soluble dyes which are soluble in alcohol, may serve effectively, Oil Soluble Black 1033 made by General Dyestuff Company, of Boston, Massachusetts, with a plant at Bayonne, New Jersey, is especially satisfactory for this purpose.

For example, a solution of ¼ ounce of said Oil Soluble Black 1033 dissolved to saturation in Solox, as above described, as the solvent, constitutes an excellent de-foaming reagent for spraying upon the wake of a vessel and is effective to quench it completely.

I claim:

1. Method of quenching the foam formed by a moving vessel and preventing the formation of a wake, comprising the step of dispersing over the water, immediately behind the stern of the vessel and in back of the water leaving the propeller blades a liquid characterized by being freely miscible with water and containing a normally solid ingredient in solution therein which is insoluble in water.

2. Method of quenching the foam formed by a moving vessel and preventing the formation of a wake, comprising the step of dispersing over the water, immediately behind the stern of the vessel and in back of the water leaving the propeller blades a liquid containing an alcohol of the group consisting of methyl and ethyl alcohols, and a normally solid ingredient in solution therein which is insoluble in water.

3. Method of quenching the foam formed by a moving vessel and preventing the formation of a wake, comprising the step of dispersing over the water, immediately behind the stern of the vessel and in back of the water leaving the propeller blades a liquid characterized by containing a mixture of methyl and ethyl alcohol and a normally solid ingredient in solution therein which is insoluble in water.

4. Method of quenching the foam formed by a moving vessel and preventing the formation of a wake, comprising the step of dispersing over the water, immediately behind the stern of the vessel and in back of the water leaving the propeller blades a liquid characterized by containing an alcohol of the group consisting of methyl and ethyl alcohols and an oil-soluble dye, in solution therein, which is insoluble in water.

5. Method of quenching the foam formed by a moving vessel and preventing the formation of a wake, comprising the step of dispersing over the water, immediately behind the stern of the vessel and in back of the water leaving the propeller blades a liquid characterized by containing a mixture of methyl and ethyl alcohols and oil-soluble Black Dye 1033, dissolved therein.

6. Method of quenching the foam formed by a moving vessel and preventing the formation of a wake, comprising the step of dispersing over the water, immediately behind the stern of the vessel and in back of the water leaving the propeller blades a liquid characterized by containing Solox and diphenylamine dissolved therein.

7. Method of quenching the foam formed by a moving vessel and preventing the formation of a wake, comprising the step of dispersing over the water, immediately behind the stern of the vessel and in back of the water leaving the propeller blades a liquid characterized by containing Solox and Oil Soluble Black 1033 dissolved therein.

GEROME BRUSH.